Feb. 12, 1957 — O. B. SHERMAN — 2,780,835
APPARATUS FOR EXTRUDING PLASTIC TUBES
Filed March 2, 1954 — 2 Sheets-Sheet 1

INVENTOR.
ORVILLE B. SHERMAN
BY W. A. Schaich
B. C. Toussaint
ATTORNEYS

United States Patent Office 2,780,835
Patented Feb. 12, 1957

2,780,835

APPARATUS FOR EXTRUDING PLASTIC TUBES

Orville B. Sherman, Toledo, Ohio

Application March 2, 1954, Serial No. 413,623

5 Claims. (Cl. 18—14)

This invention relates to plastics and particularly to an apparatus for forming tubing of organic plastic material.

According to well-known practice a tubing of organic plastic material may be formed by plasticizing the material and forcing it through an orifice having the desired configuration. This method is commonly known as extrusion.

It is an object of this invention to provide an apparatus for forming tubing wherein the inside and outer dimensions of the tubing, the shape of the tubing, the thickness of the tubing may be varied during extrusion.

Other objects of the invention will appear hereinafter.

Basically the apparatus comprises a multi-sectional body wherein the surfaces of the body form a cavity. A mandrel projects into the cavity and an outer mandrel is positioned in sliding relationship to the inner mandrel whereby a tubular cavity is formed between the outer mandrel and the sections of the body. Means is provided for moving the outer sleeve longitudinally and for moving the sections of the body toward and away from the outer mandrel to vary the shape and size of the orifice during the extrusion of the plastic material.

Referring to the accompanying drawings.

Figure 1:
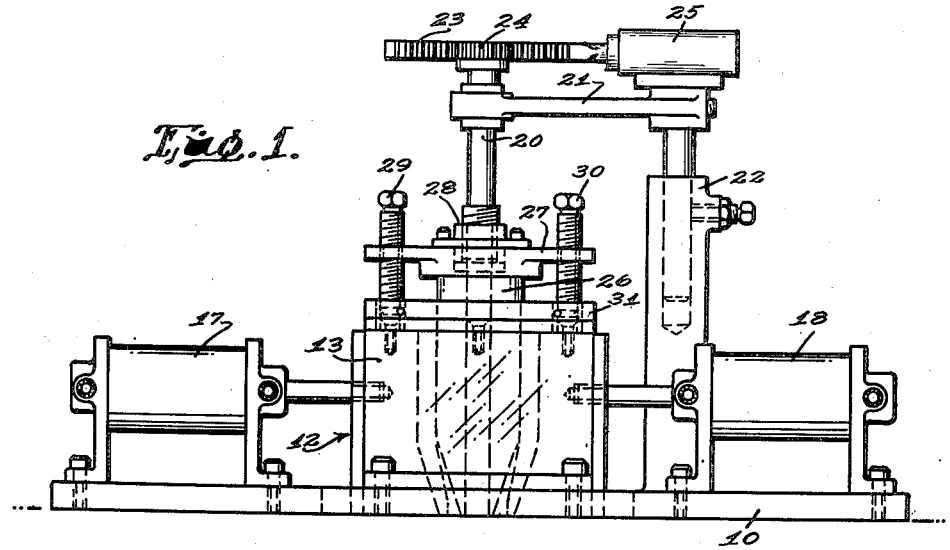
Fig. 1 is an elevational view of an apparatus embodying the invention.

Referring to Fig. 1, the apparatus includes a base 10 having an opening 11 therethrough, over which is positioned an extrusion body 12. The extrusion body 12 comprises a multiplicity of sections including two stationary upright members 13, 14 parallel, spaced apart, and bolted to the base 10. Two diametrically opposed sections 15, 16 are positioned between the stationary sections 13, 14 and are movable toward and away from each other by air cylinders 17, 18, respectively, mounted on the base 10. A mandrel 19 projects downwardly between the movable sections 15, 16 and is maintained in position by a mandrel extension 20 mounted for rotation in a bracket 21. The bracket 21 is vertically adjustable in support 22. The mandrel 19 may be rotated through a rack 23 and pinion 24 mounted on the mandrel extension 20. The rack may be reciprocated by a small air cylinder 25.

Figures 2, 3:
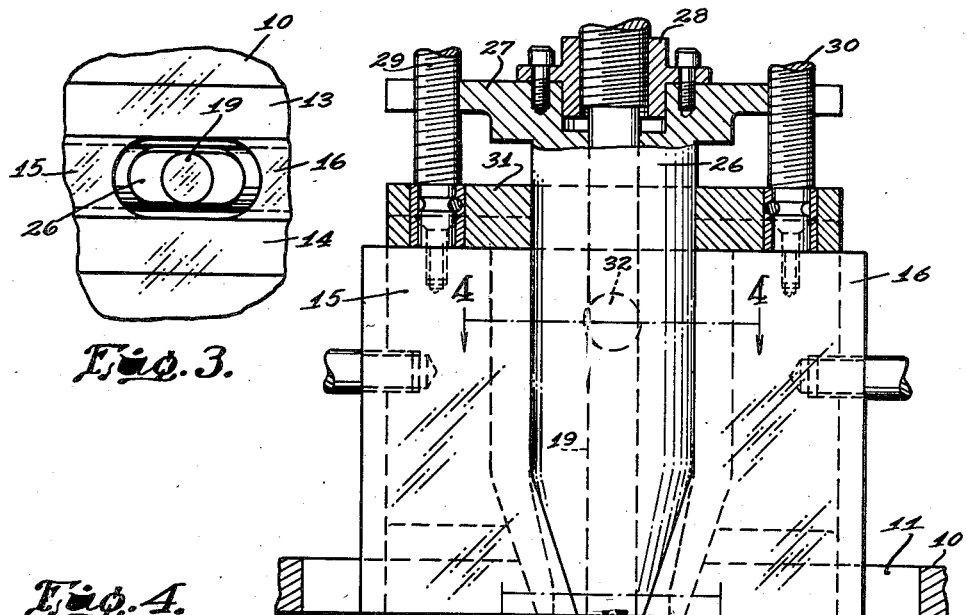
Fig. 2 is a fragmentary part-sectional view of a portion of the apparatus, parts being broken away.
Fig. 3 is a plan view of the apparatus looking into the orifice.

As shown in Fig. 2, wherein the plate 14 is removed, an outer mandrel 26 surrounds the inner mandrel 19 in flush and sliding relationship thereto. Means is provided for moving the outer mandrel longitudinally with respect to the inner mandrel and includes a flange 27 formed on the upper part of the outer mandrel 26 to which is bolted a nut 28 riding on threads on the inner mandrel extension 20. Rotation of the inner mandrel extension through the rack 23 and pinion 24 causes a vertical movement of the outer mandrel 26. Rotation of the outer mandrel is prevented by guide bolts 29, 30. A cap 31 is positioned over the sections of the body in order to form a seal around the outer mandrel 26. The rearmost stationary plate 14 is provided with an opening 32 through which plastic material from an extruder (not shown) may be supplied.

Figures 4, 5:
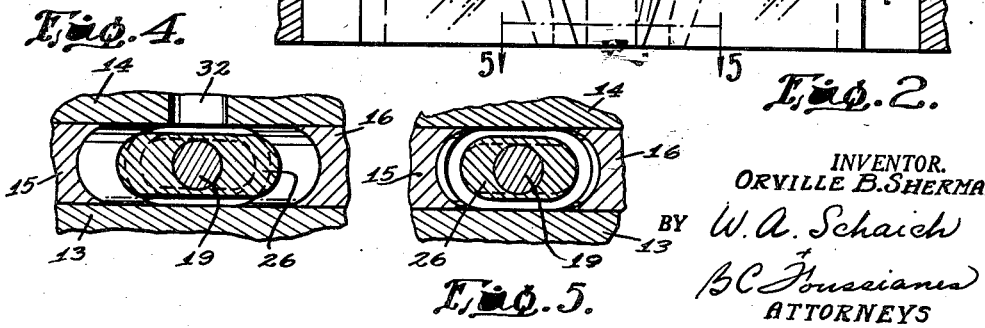
Fig. 4 is a sectional view at the line 4—4 on Fig. 2.
Fig. 5 is a sectional view at the line 5—5 on Fig. 2.
Figure 6:
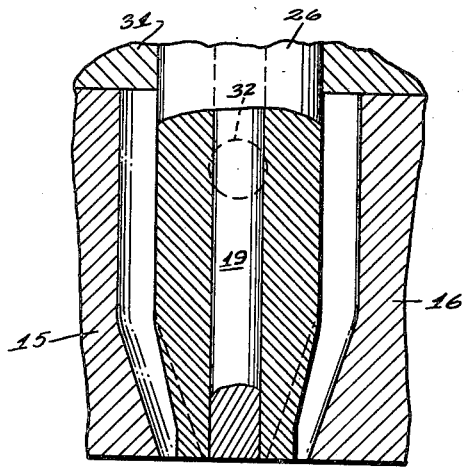
Fig. 6 is a fragmentary sectional elevational view of a portion of the apparatus shown in Fig. 2.

By the above described construction, a tubular cavity is formed between the outer mandrel and the inner surfaces of the sections of the body. More specifically as shown in Figs. 3, 4 and 5, the shape and size of the extrusion orifice is determined by the outer sleeve 26, the two stationary sections 13, 14 and the movable sections 15, 16.

The various parts of the apparatus may be moved during extrusion to adjust the inside and outside dimensions of the tubing, the size of the tubing, and the thickness of the tubing during extrusion without any interruption of the extrusion.

Figure 7:
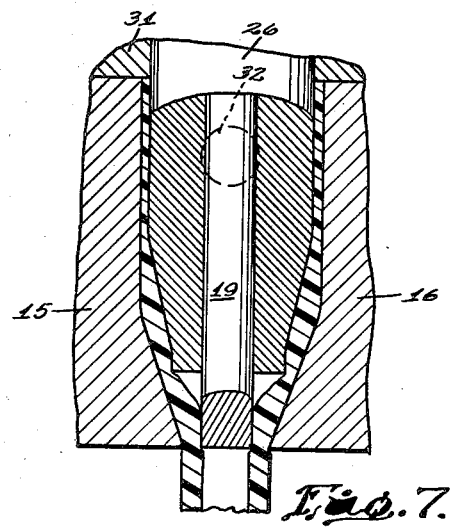
Figs. 7, 8 and 9 are similar to Fig. 6 showing the extrusion of plastic material with the parts in different positions.

As shown in Fig. 7, the outer mandrel 26 may be retracted upwardly within the body in such a manner that the tubing being extruded has the same inside dimension and shape as the dimension and shape of the inner mandrel 19. The outside dimension and shape of the tubing is controlled by the sections 13, 14, 15, 16 of the body 12. Movement of the movable sections 15, 16 toward and away from the inner mandrel will change the outer dimensions, shape and thickness of the tubing.

Figure 8:
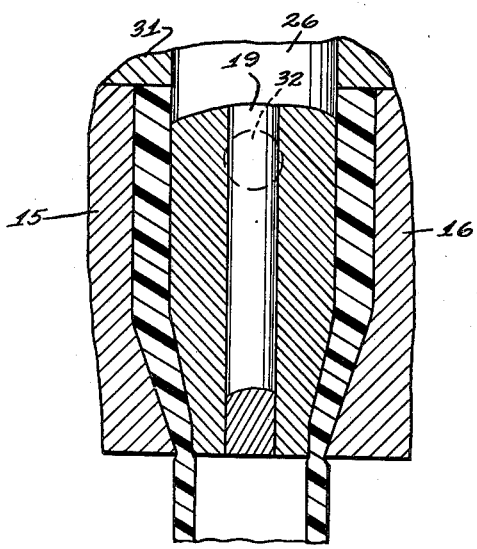
Figure 9:
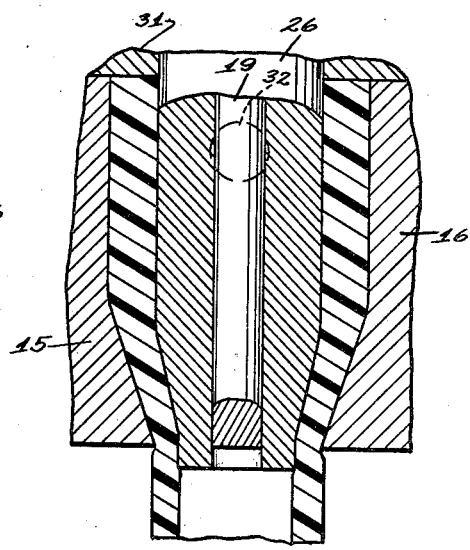

As shown in Fig. 8 the outer sleeve 26 is in flush relationship with the inner mandrel and sections of the body. The tubing being extruded has the same inside dimensions and shape as the outer mandrel. The outside dimensions of the tubing are determined by the sections of the body as is the outside shape and thickness of the tubing. Movement of the outer mandrel 26 will change the inside dimensions and shape and in addition the thickness of the tubing. Movement of the movable sections 15, 16 toward and away from the outer mandrel will change the outside dimensions, shape and thickness of the tubing. For example, in Fig. 9, the outer mandrel 26 is moved downwardly and the movable sections 15, 16 moved away from the outer mandrel to form a tubing of larger cross section and thicker walls.

It may thus be seen that the apparatus provides for the change of the inner dimensions and shape, outer dimensions and shape, and thickness of the tubing during extrusion, without any interruption of the extrusion.

The term plastic or plastics, as used herein, defines any organic material which has the required condition of plasticity to permit extrusion.

The terms tubular and tubing, as used herein, are intended to include any hollow shapes in which plastic materials may be formed including non-circular and irregular shapes.

Modifications may be resorted to within the spirit and scope of the appended claims.

I claim:

1. An apparatus for forming organic plastic material in tubular form which comprises a multi-sectional body forming an open-ended cavity, an inner mandrel positioned within said cavity, an outer mandrel surrounding the inner mandrel and in sliding relationship thereto, means for supplying plastic material to the tubular cavity formed between the outer mandrel and the body and thereby causing plastic material to flow out of the open end of the cavity in tubular form, means for moving the outer mandrel longitudinally relative to the inner mandrel during the supplying of the plastic material, and means for moving said sections of the body individually toward and away from the outer mandrel during the supplying of the plastic material to change the space between the body and the outer mandrel.

2. An apparatus for forming organic plastic material in tubular form which comprises a multi-sectional body forming an open-ended cavity, an inner mandrel positioned within said cavity, said inner mandrel being of substantially uniform cross-sectional configuration throughout, an outer mandrel surrounding the inner mandrel and in sliding relationship thereto, the configuration of the surface of said outer mandrel being similar to the configuration of the cavity formed by the sections of the body, thereby forming a tubular cavity between the body and the outer mandrel, the inner and outer configurations of which are similar, means for supplying plastic material to the tubular cavity, means for moving the outer mandrel longitudinally relative to the inner mandrel during the supplying of the plastic material, and means for moving said sections of the body individually toward and away from the outer mandrel during the supplying of the plastic material to change the space between the body and the outer mandrel.

3. An apparatus for forming organic plastic material in tubular form which comprises a multi-sectional body forming an open-ended cavity, an inner mandrel positioned within said cavity, said inner mandrel being of substantially uniform cross-sectional configuration throughout, an outer mandrel surrounding the inner mandrel and in sliding relationship thereto, the configuration of the surface of said outer mandrel being similar to the configuration of the cavity formed by the sections of the body, thereby forming a tubular cavity between the body and the outer mandrel, the inner and outer configurations of which are similar, means for supplying plastic material to the tubular cavity, means for moving the outer mandrel longitudinally relative to the inner mandrel during the supplying of the plastic material, and means for simultaneously moving diametrically opposed sections of the body toward and away from the outer mandrel during the supplying of the plastic material to change the space between the body and the outer mandrel.

4. An apparatus for forming organic plastic material in tubular form which comprises a body having an open-ended cavity therein, an inner mandrel positioned within said cavity, an outer mandrel surrounding the inner mandrel and in sliding relationship thereto, means for supplying plastic material to the tubular cavity formed between the outer mandrel and the body and thereby causing plastic material to flow out of the open end of the cavity in tubular form, and means for moving the outer mandrel longitudinally relative to the inner mandrel during the supplying of the plastic material.

5. An apparatus for forming organic plastic material in tubular form which comprises a multi-sectional body forming an open-ended cavity, the surfaces of said sections forming the cavity being convergent toward the open end of the cavity, an inner mandrel positioned within said cavity, an outer mandrel surrounding the inner mandrel and in sliding relationship thereto, the configuration of said outer mandrel varying longitudinally along the length of the mandrel, means for supplying plastic material to the tubular cavity formed between the outer mandrel and the body and thereby causing plastic material to flow out of the open end of the cavity in tubular form, means for moving the outer mandrel longitudinally relative to the inner mandrel during the supplying of the plastic material to thereby vary the internal size and shape of the tubing being extruded, and means for moving said sections of the body individually toward and away from the outer mandrel during the supplying of the plastic material to change the outer dimensions and shape of the tubing being extruded.

References Cited in the file of this patent

UNITED STATES PATENTS

| | | |
|---|---|---|
| 1,350,722 | Goodenberger | Aug. 24, 1920 |
| 1,876,256 | Maynard | Sept. 6, 1932 |
| 2,513,106 | Prendergast | June 27, 1950 |
| 2,553,690 | Walsh | May 22, 1951 |